Patented Jan. 15, 1929.

1,699,229

UNITED STATES PATENT OFFICE.

WILLIAM F. DOWNS, OF CHATHAM, NEW JERSEY; MARY GARDNER DOWNS ADMINISTRATRIX OF SAID WILLIAM F. DOWNS, DECEASED.

PROCESS FOR THE MANUFACTURE OF ANHYDROUS METALLIC CHLORIDES.

No Drawing.      Application filed January 12, 1925. Serial No. 1,935.

This invention relates to the process of making metallic anhydrous chlorides when the materials used for the purpose consist of carbon, chlorine and the oxide of the metal whose chloride is desired, and its novelty consists in the steps of the process.

Metallic chlorides are almost universally soluble in water, the notable exception being silver chloride. Practically all metallic chlorides can be volatilized and condensed as stable compounds.

Anhydrous aluminum chloride can not be so produced because when the attempt is made to drive the water from its hydrous form by the application of heat, it breaks up into alumina as a residue and the chlorine passes off with the water mainly as hydrochloric acid fumes.

Some other chlorides such for example as selenium and titanium possess the same properties, and all such can be made by the process herein described and the process is especially useful for the manufacture of anhydrous aluminum chloride which is now so much desired.

Much trouble is disclosed by the various inventions as to the difficulty of finding proper and durable materials to be used in the construction of the apparatus in which the materials are brought into contact.

At the temperature necessary, chlorine has a corrosive action on most of the materials that can be obtained for said apparatus.

Fused silica is highly resistant to this action and now can be obtained in various grades of purity and shapes which are available for the purpose.

The higher the percentage of the silica in such compositions the more resistant they are to the corrosive action of hot chlorine.

It is not the purpose here to discuss or claim special materials for the manufacture of an apparatus in which to make anhydrous metallic chlorides, but to set forth the particular novel method of so producing physical adherent contact of minute particles of carbon and a metallic oxide that, when chlorine is passed through and over such hot adherent particles, all three of the necessary ingredients are simultaneously within the same sphere of reactive influence and the desired chloride is efficiently produced thereby.

It is generally well known that under the conditions of temperature employed, chlorine and carbon do not react on one another; it is also well known that chlorine does not react on alumina under similar conditions; and also carbon and alumina do not react on each other under like conditions.

The reaction demands that all three (3) ingredients must be simultaneously within the sphere of reactive influence.

If carbon has been previously combined with chlorine as carbon tetra-chloride then this combination may be made to act as an integral unit and the contact of this unit with alumina gives the desired simultaneous contact of all three ingredients.

This would mean that carbon tetra-chloride would be the reactive agent to be used.

The fact that carbon tetra-chloride can be used in the manufacture of metallic chlorides is not disputed, but its use adds materially to the cost of making metallic chlorides, thus making it impractical commercially.

A similar explanation would apply to the use of aluminum carbide and chlorine for the manufacture of aluminum chlorides.

The difficulties and cost of making aluminum carbide precludes its consideration altogether.

Carbon, alumina and free chlorine constitute by far the cheapest group of raw materials that can be used in the manufacture of aluminum chloride.

The use of the oxide of many other metals would likewise constitute the cheapest group of raw materials designed to make their particular chlorides.

The particular purpose of this invention is to so contact the two solids, carbon and metallic oxide, that they remain in adherent contact throughout all the physical changes and movement incident to their being brought into contact with the hot chlorine.

In order to bring about this adherent contact I use some organic substance which yields residual carbon on being calcined or retorted with exclusion of air.

This organic substance must be capable of dissolving in an available solvent, and the most satisfactory solvent is water, which is also the most economical.

I may use such organic substances as the saccharines, including molasses, the starches, the oils and fats, and such other substances as yield residual carbon on being retorted, but for the sake of economy I prefer to use the cheaper forms of molasses.

I dilute a quantity of molasses with water and add to the solution a quantity of very finely divided alumina.

The ratio of the quantity of molasses used to the quantity of alumina used must be such that the quantity of carbon resulting as residual carbon from the charring of the molasses will be fully sufficient to maintain a ratio of fifteen (15) parts of carbon to eighty-five (85) part alumina, as has been shown to be the required ratio in the formula already discussed.

I also take care that the volume of the solution used is fully sufficient to completely wet and intimately mix with the quantity of alumina used. If the particular organic substance used is a thin liquid but little or no solvent will be required. The volume of the solution of organic substance must always be sufficient to fully wet and intimately mix with the particles of metallic oxide being used. An excess of sovent or volume of organic solution simply requires longer time for evaporation. Part of the required amount of carbon may be added as such. I prefer, however, that the full complement of carbon required is obtained from the organic substance used.

To make this more specific I give the following figures, black strap molasses yields an average of thirty (30) per cent residual carbon, this means that fifty (50) pounds of black strap molasses would yield fifteen (15) pounds of residual carbon.

Therefore, in carrying out my process, to fifty (50) pounds of such molasses I add eighty-five (85) pounds of alumina together with sufficient water so that the volume of the solution thoroughly wets and intimately mixes with the fine particles of the alumina used.

The finer the alumina the greater the volume of solution required.

After thoroughly commingling this mixture I evaporate the solution until a pasty mass somewhat like a caramel mixture is obtained.

The temperature is then raised and air excluded until the mass is charred.

This may be done in the same vessel, or the pasty, caramel like mass may be transferred to some other vessel according to the conveniences of the equipment at hand.

The charred mass is cooled to a temperature below that of oxidation of carbon before exposure to air.

It will be found to be porous and easily crushed to fine particles as desired.

Each particle of alumina will be found to have its due proportion of adherent carbon; it will also be found that the adherent contact of the carbon and alumina is sufficiently strong to hold them together throughout the physical movements of handling and feeding them into a reaction chamber where they are to come in contact with hot chlorine in the manufacture of anhydrous aluminum chloride.

Having in this novel way so contacted the two solids, carbon and the metallic oxide, that they act as an integral unit when subjected to the action of hot chlorine, I next feed them into a reaction chamber, and said chamber may be either revolving or stationary. So far the process herein described is concerned the requirements of the reaction chamber are that it can be maintained at a regulated temperature by external heat control, and that it be composed of materials which are resistant and durable under the conditions of the reaction.

I feed the contacted solids at a regulated rate through any convenient feeding device into the the reaction chamber; I also feed into said chamber a correspondingly regulated feed of chlorine. The chlorine may be pre-heated to the reactive temperature (700° C. to 800° C.) wholly or in part, before it reaches the reaction chamber; or, it may receive its final heat requirement in the reaction chamber itself. The feeds of the contacted solids and chlorine are regulated in amount with reference to one another as per the ratio of weight requirements shown by the chemical formulæ, care being taken that there shall be always a quantity of the solids present in the reaction chamber in excess of the combining requirements of the amount of chlorine present at any moment. The two feeds have each their own separate sources of supply and are so arranged with reference to one another that the feed of chlorine passes through and over the supply of solids maintained in the reaction chamber.

As these materials come in contact in the reaction chamber under proper temperature control, the reaction set forth in the chemical equation given occurs and anhydrous metallic chloride is produced. In the illustration given this is anhydrous aluminum chloride. As the gases evolves from the reaction soon fill the reaction chamber, an exit for their escape is provided by which they pass to condensers and the metallic chloride condensed and collected in the usual manner.

I claim:

1. The process of making an anhydrous metallic chloride which comprises mixing the oxide of the metal with a solution of residual carbon yielding organic compound of such proportions as give the required ratio of carbon to the oxide used, intimately mixing the oxide in this solution, evaporating the solvent, charring the residual mass, and feeding these solids in their adherent contact into a revolving reaction chamber against a regulated current of hot chlorine, maintaining the temperature of said chamber by external heat and condensing the metallic chloride from the gases evolved.

2. The process of making aluminum chloride which comprises mixing alumina with a solution of residual carbon yielding organic compound of such proportions as give the required ratio of carbon to the alumina used, intimately mixing the alumina in this solution, evaporating the solvent, charring the residual mass, and feeding these solids in their adherent contact into a revolving reaction chamber against a regulated current of hot chlorine, maintaining the temperature of said chamber by external heat and condensing the aluminum chloride from the gases evolved.

3. The process of making an anhydrous metallic chloride which comprises mixing the oxide of the metal with a solution of molasses in such proportions as give the required ratio of carbon to the oxide used, intimately mixing the oxide in this solution, evaporating the solvent, charring the residual mass, and feeding these solids in their adherent contact into a revolving reaction chamber against a regulated current of hot chlorine, maintaining the temperature of said chamber by external heat and condensing the metallic chloride from the gases evolved.

4. The process of making aluminum chloride which comprises mixing alumina with a solution of molasses in such proportions as give the required ratio of carbon to the alumina used, intimately mixing the alumina in this solution, evaporating the solvent, charring the residual mass and feeding these solids in their adherent contact into a revolving reaction chamber against a regulated current of hot chlorine, maintaining the temperature of said chamber by external heat and condensing the aluminum chloride from the gases evolved.

In testimony whereof I affix my signature.

WILLIAM F. DOWNS.